UNITED STATES PATENT OFFICE.

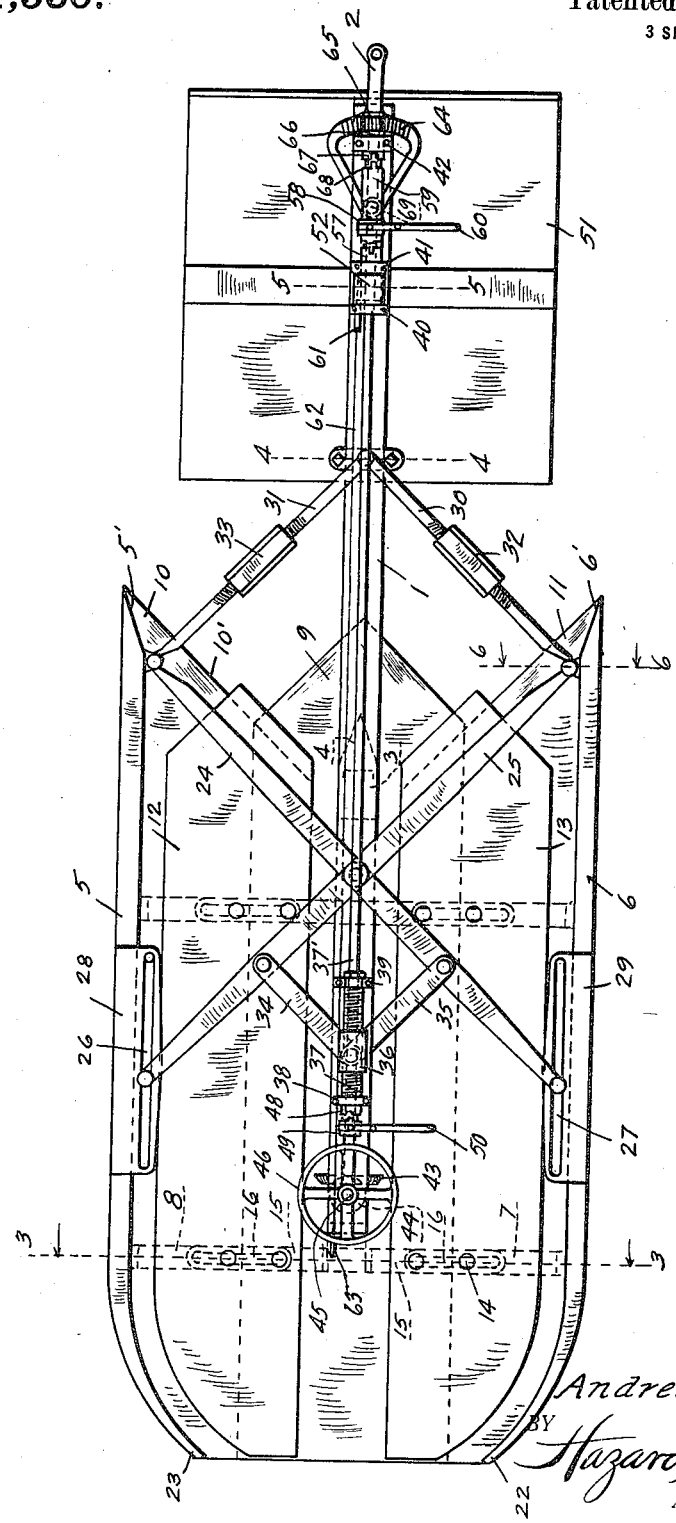

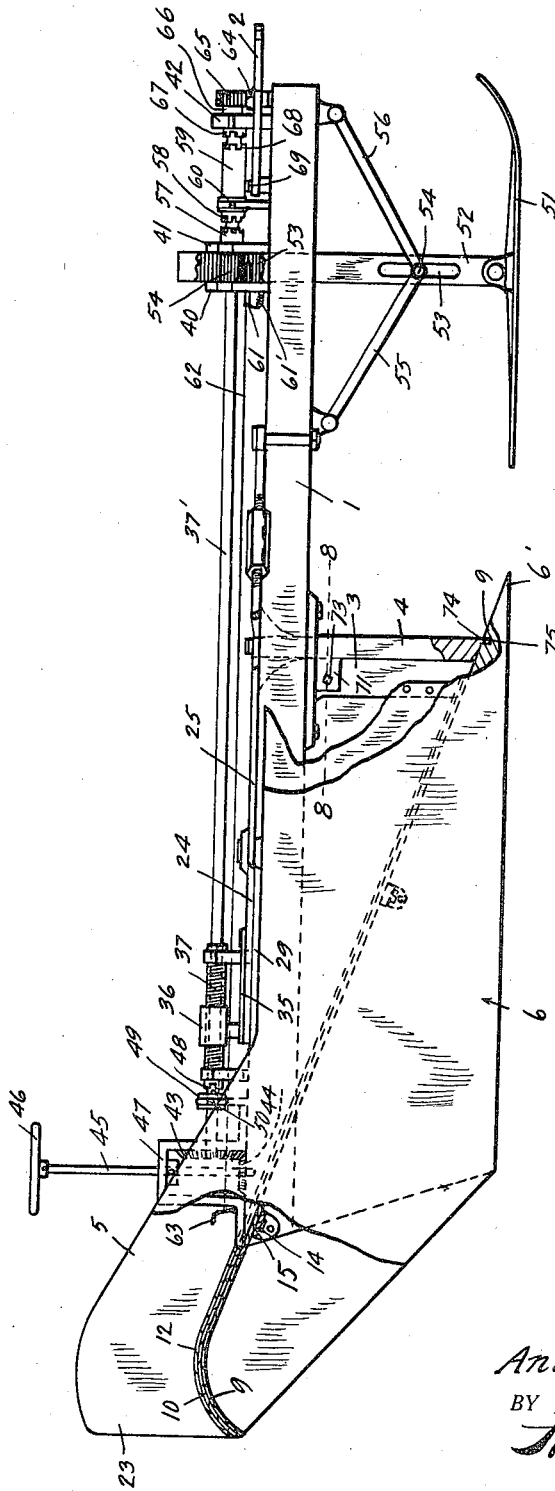

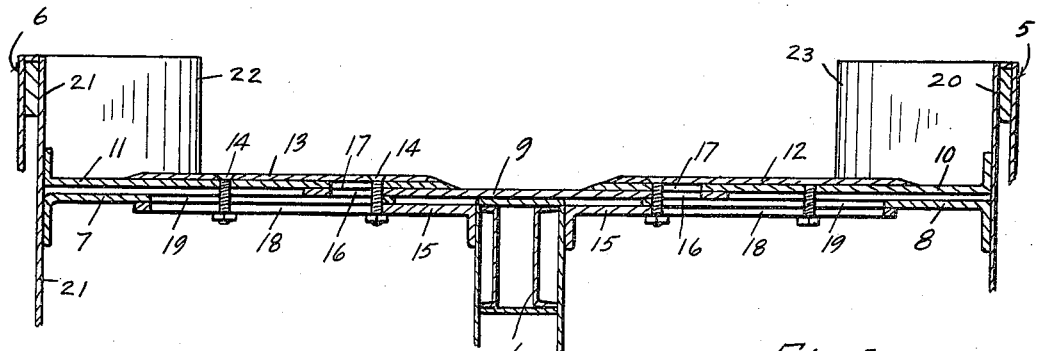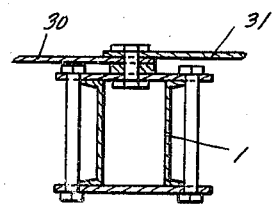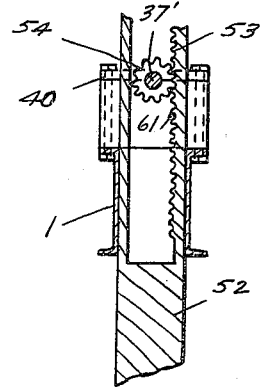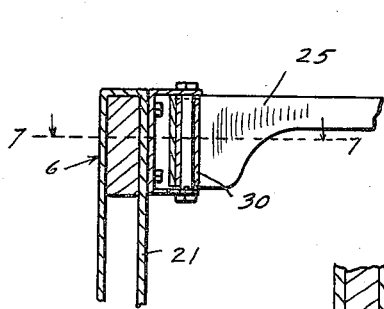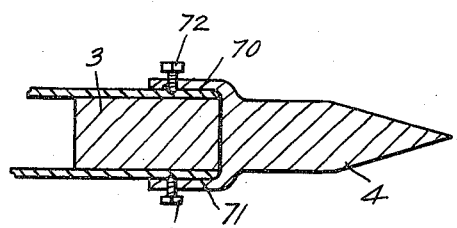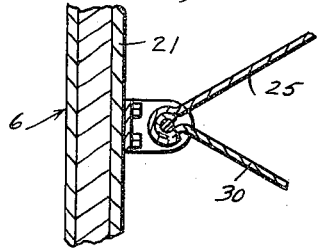

ANDREW SALTZER, OF LOS ANGELES, CALIFORNIA.

PLOW.

1,311,530.  Specification of Letters Patent.  Patented July 29, 1919.

Application filed October 1, 1918. Serial No. 256,468.

*To all whom it may concern:*

Be it known that I, ANDREW SALTZER, a citizen of the United States, residing at Los Angeles, in the county of Los Angeles and State of California, have invented new and useful Improvements in Plows, of which the following is a specification.

My invention relates to an adjustable plow and more especially an adjustable ditching plow, the width of cut of which may be adjusted to suit varying conditions. It consists in the novel features herein shown, described and claimed.

An object of my invention is to provide a plow for digging ditches or trenches.

Another object is to provide a plow for the purpose mentioned above which may be readily adjusted as to width of cut so that the same plow may be used for digging trenches of various widths.

In the accompanying drawings Figure 1 is a plan of the plow which embodies the principles of my invention.

Fig. 2 is a side elevation of the plow shown in Fig. 1.

Fig. 3 is an enlarged transverse vertical sectional view on the line 3—3 of Fig. 1.

Fig. 4 is an enlarged view of a transverse vertical section on line 4—4 of Fig. 1, showing the method of attaching the connecting rods to the plow beam.

Fig. 5 is an enlarged view of a transverse vertical section through the plow beam on the line 5—5 of Fig. 1, showing the details of the mechanism for adjusting the height of the gage shoe.

Fig. 6 is an enlarged sectional view on the line 6—6 of Fig. 1 showing the method of pivoting the adjusting members to the side runners.

Fig. 7 is a horizontal section on the line 7—7 of Fig. 6 further illustrating the pivotal arrangement of the adjusting parts.

Fig. 8 is an enlarged horizontal section through the upper end of the colter showing the method of attaching it to the middle runner of the plow.

As shown on the drawings, a horizontal beam 1 provided with a draw bar 2 pivotally mounted on its forward end is rigidly attached to a middle runner 3, the runner having a vertical cutting iron or colter 4 attached to its forward end. Side runners 5 and 6 with sharpened forward ends 5' and 6' which serve as side cutters are held in equally spaced and parallel relationship to the middle runner by connecting bars 7 and 8 riveted to their inner sides. A middle cutting plate 9 having a plow pointed forward end and sloping upwardly toward the rear at an angle of approximately 30° with the beam is rigidly fixed to the middle runner. A side cutting plate 10 having its forward end cut at an oblique angle so that its sharpened edge 10' inclines inwardly and backwardly from the outer side toward the middle cutting plate and sloping upwardly toward the rear in parallel relation to the middle plate, is rigidly fastened to the inner side of the side runner 5, so as to extend inwardly from the side runner and at right angles to it and so as to have its inner edge overlapping the adjacent outer edge of the middle cutting plate. A similar side cutting plate 11 is similarly attached to the inner side of side runner 6, its inner edge over-lapping the adjacent outer edge of the middle plate in like manner, and to the same extent as plate 10. Additional cutting plates 12 and 13 having plow pointed forward ends which project forward into the angles formed by the cutting edges of the middle plate and side plates are superimposed upon the side plates 10 and 11 respectively. These cutting plates are held in proper relation to each other by plow bolts 14 extending downwardly through the plates, and through connecting bars 7 and 8 and stiffening crossbars 15. The middle plate 9 and the side plates 10 and 11 have coinciding slots 16 and 17 through which bolts 14 extend, thus providing for sidewise adjustment between the over-lapping middle and side plates. Crossbars 15 have longitudinal slots 18 and connecting bars 7 and 8 have similar adjusting slots 19 coinciding with slots 18 through which bolts 14 extend, said slots allowing longitudinal adjustment between said crossbars and connecting bars without removing the bolt.

Vertical plates 20 and 21 are fixed along the upper edges of the side runners. They extend above the inclined cutting plates and combine with the cutting plates to form an inclined chute along which the dirt travels as the plow moves forwardly the cutting plates forming the floor and the vertical side plates forming the sides of the chute. The rear ends 22 and 23 of side plates 21 and 22 respectively are warped and turn inward to narrow the discharge opening of the chute so that the dirt may be discharged on a conveyer, or the like, drawn along in the trench behind the plow.

The mechanism for varying the width of cut of the plow may be described as follows: Crossbars of equal length 24 and 25 pivotally joined together at their middle points have their forward ends pivotally connected to the forward ends of the side runners while their rear ends are pivoted within longitudinal slots 26 and 27 formed in guide plates 28 and 29 which are fixed to the upper edge of the side runners toward the rear end of the plow.

A connecting rod 30 parallel to a crossbar 24 and a connecting rod 31 parallel to crossbar 25 have their rear ends attached pivotally to the forward ends of the runners and the crossbars 24 and 25 respectively, while their forward ends are pivotally attached to the center of the beam as particularly shown in Fig. 4. Turn buckles 32 and 33 form a part of connecting rods 30 and 31 respectively, and are used to adjust the width of cut as hereinafter described. The connecting links 34 and 35 of equal length have their forward ends pivotally attached to the cross bars 25 and 24 respectively at points approximately midway between their middle points and their rear ends.

The rear ends of these connecting links are pivotally attached to an internally screw threaded sleeve 36 which travels on an externally screw threaded sleeve 37 mounted on a shaft 37', which turns in bearings 38, 39, 40, 41 and 42 attached to the upper side of the plow beam. A bevel gear 43 keyed to the rear end of shaft 37' meshes with a bevel gear 44, which in turn is keyed to the lower end of a vertical shaft 45, having a hand wheel 46 fixed on its upper end, the vertical shaft 45 turning in bearings 47 fixed to the upper surface of the plow beam.

The rear end of sleeve 37 extends through bearing 38 and is formed into a clutch member 48. A second clutch member 49 in the form of a splined sleeve mounted on the shaft adjacent to the clutch member 48 is adapted to turn with the shaft in one end of a lever 50 pivoted on the plow beam.

It will be seen that the combination of crossbars and connecting links acts on the principle of a lazy tongs to move outward or inward and to maintain in parallel relation to each other the side runners and thus widen or narrow the cut of the plow.

A gage shoe 51 pivotally mounted on the lower end of an adjustable vertical bar 52 serves to regulate the depth of cut of the plow. The adjustable bar 52 has a longitudinal slot 53 through which a bolt 54 is inserted, said bolt also passing through the ends of bracing rods 55 and 56 which are attached to the under side of the plow beam. The upper end of the adjustable bar 52 is provided with a rack 53 which meshes with a pinion 54, the pinion being formed on a sleeve which extends through bearing 41 and has its forward end formed into a clutch member 57. A similar clutch bearing 58 which registers with clutch member 57 is formed on a splined sleeve 59 mounted on the forward end of shaft 37', the latter sleeve being adapted to turn in one end of a lever 60 so pivoted on the plow beam as to shift the sleeve longitudinally on the shaft. A retaining pin 61 extends from the rear forwardly through bearing 40 between the teeth of the rack and is adapted to be withdrawn against a spring 61' by a cable 62 which extends backwardly to a foot lever 63. As is evident, the purpose of this pin is to hold the rack and the gage shoe attached thereto at any desired height. The draw bar 2 turning on a pivot 69 is provided with an arcuate rack 64 which meshes with a pinion 65 formed on a sleeve 66, which extends backward through bearing 42 and ends in the clutch member 67. The forward end of the sleeve 59 is formed into a similar clutch member 68 adapted to register with clutch member 67.

The method of attaching cutting iron or colter 4 to the front end of the middle runner is particularly shown in Fig. 8. Lugs 70 and 71 are formed on the sides of the upper rear edge of the colter. These lugs embrace the front end of the middle runner 3 directly under the beam and have clamping screws 72 and 73 threaded through the lugs 70 and 71 respectively into the sides of the runner, thus holding the upper end of the colter securely in place. The lower end of the colter is formed into a point or toe 74 which fits into a socket 75 formed in the forward end of the middle cutting plate slightly back of its point. The purpose of this arrangement is to permit removal of the colter by loosening clamping screws 72 and 73, pulling the top forward and lifting it out of its socket.

In the operation of the plow, the nuts on the plow bolts 14 are loosened to permit movement of the cutting plates and supporting bars with reference to each other. Lever 50 is then operated to throw clutch members 48 and 49 into an engagement with each other and hand wheel 46, is turned until the runners are set to the desired width of cut. Turn buckles 32 and 33 are then manipulated to spread the forward ends of the runners and the cutting edges 5' and 6' slightly farther apart so as to provide for easy clearance of the side runners. Nuts on plow bolts 14 are then re-tightened and clutch members 48 and 49 are released by restoring hand lever 50. Clutch members 57 and 58 are then brought into engagement by operating lever 60, and foot lever 63 is operated to withdraw pin ion 61. Hand wheel 46 is now turned until the gage shoe 51 is brought to the desired height, whereupon foot lever 63 is released, and retaining pin 61 returns to its normal position holding the gage shoe in place. When it is desired to produce side draft on the plow beam, lever 60 is actuated to throw clutch members 67 and 68 into engagement and hand wheel 46 is turned until the desired side draft is obtained through the action of the pinion wheel 65 upon draw bar rack 64. By this arrangement the side draft may be varied in amount and held as long as desired through control of hand wheel 46.

In this controlling apparatus it is evident that there are three separate operations: first, of adjusting the width of cut of the plow; second, of adjusting the height of the gage shoe; and third, of producing side draft on the plow beam. It is evident also that anyone of these operations may be performed independently of the other two.

The operation of the crossbars 24 and 25 connecting rods 32 and 33 and the connecting links 34 and 35 to increase or decrease the width of the plow is as follows: Forward movement of sleeve 36 on a sleeve 37 produced by turning the hand wheel forces links 34 and 35 forwardly and outwardly. This action forces the ends of crossbars 34 and 35, and the parts to which they are attached, outwardly and widens the plow. The reverse action of sleeve 36 on sleeve 37 pulls links 34 and 35 backwardly and inwardly which in turn pulls inwardly the ends of the crossbars 34 and 35 and narrows the plow. It is evident that in this action, the pivot pins in the rear ends of the crossbars 34 and 35 move forwardly and backwardly in the guide plates 28 and 29.

The dotted lines in Fig. 1 indicate the limits in width of cut and in adjustment of the plow.

From the foregoing it will be seen that I have produced a plow which can readily be adjusted to different widths and which will make a clean cut ditch or trench in a single operation.

Various changes may be made without departing from the spirit of my invention as claimed.

I claim:

1. An adjustable plow comprising, a plow beam, a middle runner rigidly fixed thereto, two side runners parallel with the middle runner and equally spaced from it, a series of cutting plates attached to said runners, and means for laterally adjusting the side runners with reference to each other and to the middle runner.

2. An adjustable trench digging plow comprising, a plow beam, a middle runner attached to said plow beam, two side runners parallel to said middle runner and equally spaced therefrom, a series of overlapping cutting plates sloping from the front end of the plow upwardly toward the rear, and means for laterally adjusting the side runners with reference to each other and to the middle runner.

3. An adjustable trench digging plow comprising, a plow beam, a middle runner rigidly fixed thereto, two side runners parallel to said middle runner and equally spaced therefrom, a series of longitudinally inclined cutting plates, vertical side plates attached to the side runners and extending above the cutting plates so as to form with said cutting plates a chute for carrying the dirt rearwardly of the plow, and means for laterally adjusting said side runners with reference to each other and to the middle runner.

4. An adjustable trench digging plow comprising, a plow beam, a middle runner rigidly fixed thereto, two side runners parallel to said middle runner and equally spaced therefrom, said side runners having their forward ends tapered to a cutting edge, a series of overlapping longitudinally inclined cutting plates adjustably fixed between said side runners, and means for laterally adjusting said side runners with reference to each other and to the middle runner.

5. An adjustable trench digging plow comprising, a plow beam, a middle runner fixed thereto, two side runners parallel to said middle runner and equally spaced therefrom, a series of longitudinally inclined cutting plates adjustably fixed between said side runners, a pivoted drawbar attached to the forward end of said plow beam, means for laterally adjusting said side runners with reference to each other and to the middle runner, and mechanically operated means for producing a side draft upon the plow beam and for varying such side draft.

6. An adjustable plow comprising, a plow beam, a middle runner rigidly fixed thereto, two side runners parallel to said middle runner and equally spaced therefrom, transverse cutting means adjustably fixed between said side runners, and means for laterally adjusting said side runners with reference to each other and to the middle runner.

In testimony whereof I have signed my name to this specification.

ANDREW SALTZER.

Copies of this patent may be obtained for five cents each, by addressing the "Commissioner of Patents, Washington, D. C."